INVENTORS
FRANK RADCLIFFE MORTIMER
WILLIAM HAROLD BENT
BY
Benj. T. Rauber
ATTORNEY United States Patent Office 2,992,046
Patented July 11, 1961

2,992,046
FLUID PRESSURE CONTROL VALVE MECHANISM
Frank Radcliffe Mortimer, Styvechale, Coventry, and William Harold Bent, Leicester, England, assignors to Dunlop Rubber Company Limited, London, England, a British company
Filed Nov. 24, 1958, Ser. No. 775,742
Claims priority, application Great Britain Dec. 3, 1957
13 Claims. (Cl. 303—54)

This invention relates to a hydraulic control valve mechanism which is particularly though not exclusively intended for controlling a hydraulic braking system for a vehicle.

The principal object of the invention is to provide a hydraulic control valve mechanism which is capable of operating a braking or other mechanism notwithstanding failure of the hydraulic power supply.

Road vehicle braking systems have been proposed comprising a rotary inertia mechanism associated with each of the road wheels for automatically preventing overbraking and the consequent slipping or skidding of the vehicle wheels. Such systems, which are necessarily power-operated, cannot be controlled through a normal master-cylinder mechanism and a further object of the present invention is to provide a hydraulic control valve mechanism capable of both normal and emergency control of a braking system of this nature.

The invention provides a hydraulic control valve mechanism comprising a housing having a pressure inlet, an exhaust outlet and a supply outlet for supplying liquid under pressure to a mechanism to be operated, and an externally actuable operating member within the housing which is movable over a normal range to connect the supply outlet alternately to the pressure inlet and to the exhaust outlet and which is normally effective to cause delivery of liquid from the supply outlet at a pressure proportional to the load applied to it, the operating member being capable of emergency movement beyond its normal range, in the event of failure of the hydraulic pressure supply, to displace liquid trapped in the housing through the supply outlet.

Where the valve mechanism is intended for use with a hydraulic vehicle braking system including anti-skid devices the housing has a further inlet for connection to a line for returning liquid from the brakes on operation of any of the anti-skid devices and which normally communicates with the exhaust outlet, emergency operation of the hydraulic member serving to disconnect the further inlet from the exhaust outlet.

One embodiment of the invention will now be described in more detail, by way of example, with reference to the accompanying drawings, in which.

Figure 1:
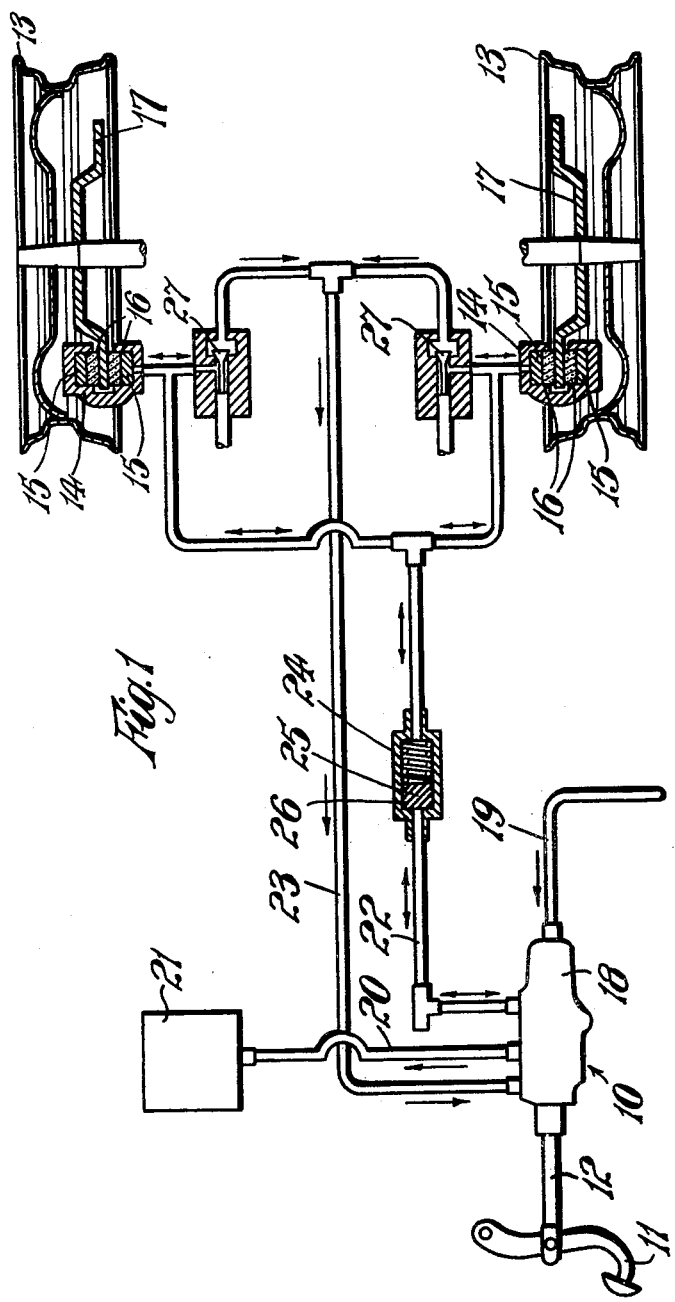
FIGURE 1 is a diagrammatic view of a brake control system for a motor vehicle.

The system shown in FIGURE 1 comprises a brake control valve mechanism 10, operable by pressure on a brake pedal 11 connected to a piston rod 12 to apply braking pressure to the wheels 13. The wheels have disc brakes, and braking is effected by supplying liquid under pressure to brake cylinders 14, so causing pistons 15 to move inwards to bring friction pads 16 into engagement with the discs 17.

The housing 18 of the brake control valve mechanism communicates with a pressure inlet line 19, an exhaust outlet line 20 leading to a supply tank 21, a supply line 22 leading to the brake cylinders 14 and a return line 23 from the brake cylinders. The line 22 contains a modulator 24, in which is mounted a piston 25 having in its external surface a narrow helical groove 26.

On application of the brake pedal, the line 19 is connected to the line 22 as later described and the modulator piston 25 is moved forward in its cylinder 24 to deliver liquid to the brake cylinders 14 and so apply the brakes. In the event of overbraking and skidding of any of the wheels, an associated inertia device, e.g. of the type described in co-pending application Ser. No. 675,771, filed August 1, 1957, opens an anti-skid valve 27 to allow liquid to return from the brake cylinder 14 to the tank 21 via the line 23, the control valve 10 and the exhaust line 20. So long as the valve 27 remains open, the restricted flow of liquid under pressure provided through the groove 26 in the modulator piston is insufficient to maintain the braking pressure.

Figure 2:
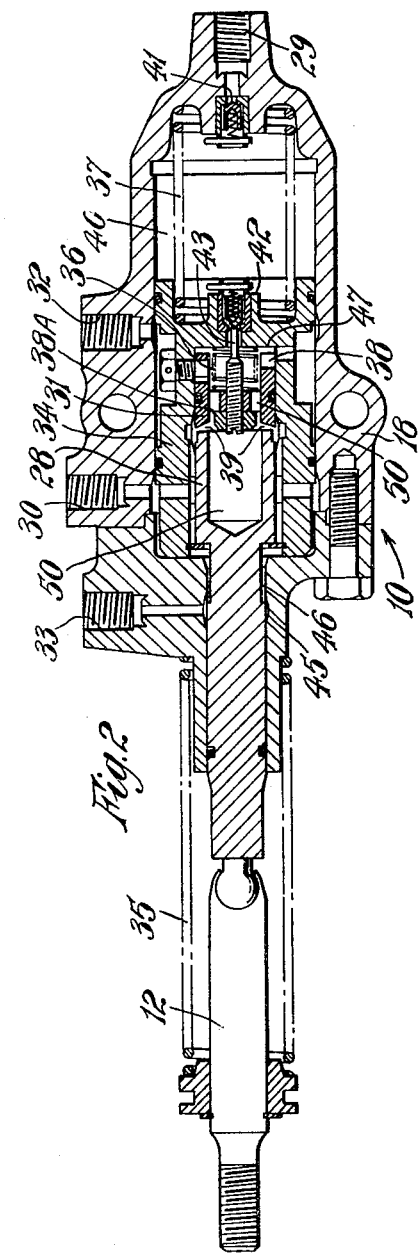
FIGURE 2 is a longitudinal section through the brake control valve mechanism.

Turning now to FIGURE 2, it will be seen that the control valve mechanism has an inlet 29 for connection to the pressure supply line 19, an exhaust outlet 30 for connection to the exhaust line 20, a supply outlet 32 for connection to the line 22 and a further inlet 33 for connection to the return line 23. FIGURE 2 shows the parts in the position which they occupy when the brake pedal is not depressed. The housing 18 of the control valve mechanism contains three pistons, viz an end piston 28 coupled to the piston rod 12, an inner tubular piston 31 and an outer tubular piston 34 in which the inner tubular piston may slide to a limited extent. Springs 35, 36, 37 normally hold the three pistons in the extreme left hand positions shown. As the result liquid can flow from the brake cylinders to exhaust through the valve mechanism via the outlet 32, ports 38, 38A, in the piston 31, through a clearance 39 between pistons 31, 28 and through the exhaust outlet 30. A pressure chamber 40 at the right hand of the control valve mechanism is filled with liquid at supply pressure, e.g. 1500 p.s.i., admitted thereto by a non-return valve 41, and is retained in the chamber 40 by a valve 42 mounted in the end face of the piston 34.

The space within the outer piston 34 constitutes a supply chamber 50 communicating with the supply port 32 and in which the pistons 28 and 31 are movable.

When the brake pedal is depressed, the piston 28 is moved in against its spring 35 and first engages the edge of the inner tubular piston 31 and takes up the clearance 39 to cut off the supply outlet 32 from the exhaust outlet 30 and then causes the piston 31 to move in against its spring 36, until it seats against the face 47 of the piston 34, and also opens the valve 42 by means of a pin 43 carried by the piston 31. Liquid under pressure can accordingly flow via ports 38 through the outlet 32 to the brake cylinders and the pressure inside the chamber 50 increases until it balances the load applied to the brake pedal and returns the piston 31 sufficiently to allow the valve 42 to close. The pressure applied to the brakes is thus proportional to the load applied by the foot to the brake pedal. In the event of any one of the anti-skid valves opening, liquid can return from the braking cylinders to the tank through the control valve mechanism via an annular port 45 and a channel provided by a waisted portion 46 of the piston 28. As will readily be understood, on release of pressure on the brake pedal, the spring 35 returns the piston 28 to the position shown, so re-establishing the clearances 39 and connecting the brake cylinders to exhaust. The spring 36 also returns the piston 31 to allow the valve 42 to close.

If the hydraulic pressure supply should fail, liquid will be trapped in the chamber 40 by closure of the non-return valve 41 but opening of the valve 42 by the pin 43 will not, as before, result in powered application of the brakes. However, continued movement of the brake pedal and the pistons 28, 31 will cause bodily inward movement of the piston 34 against its spring 37, so forcing liquid in the chamber 40 through the outlet 32 and along the pipes leading to the brake cylinders. Emergency operation of the brakes is thus possible, an abnormal stroke of the brake pedal resulting in positive displacement of liquid to the brake cylinders. As the result of the abnormal inward travel of the piston 28, the groove afforded by its waisted portion 46 is brought out of register with the port 45. The anti-skid valves are accordingly unable to relieve the braking pressure since liquid can no longer return from the brake cylinders to exhaust through the control valve.

Figure 3:
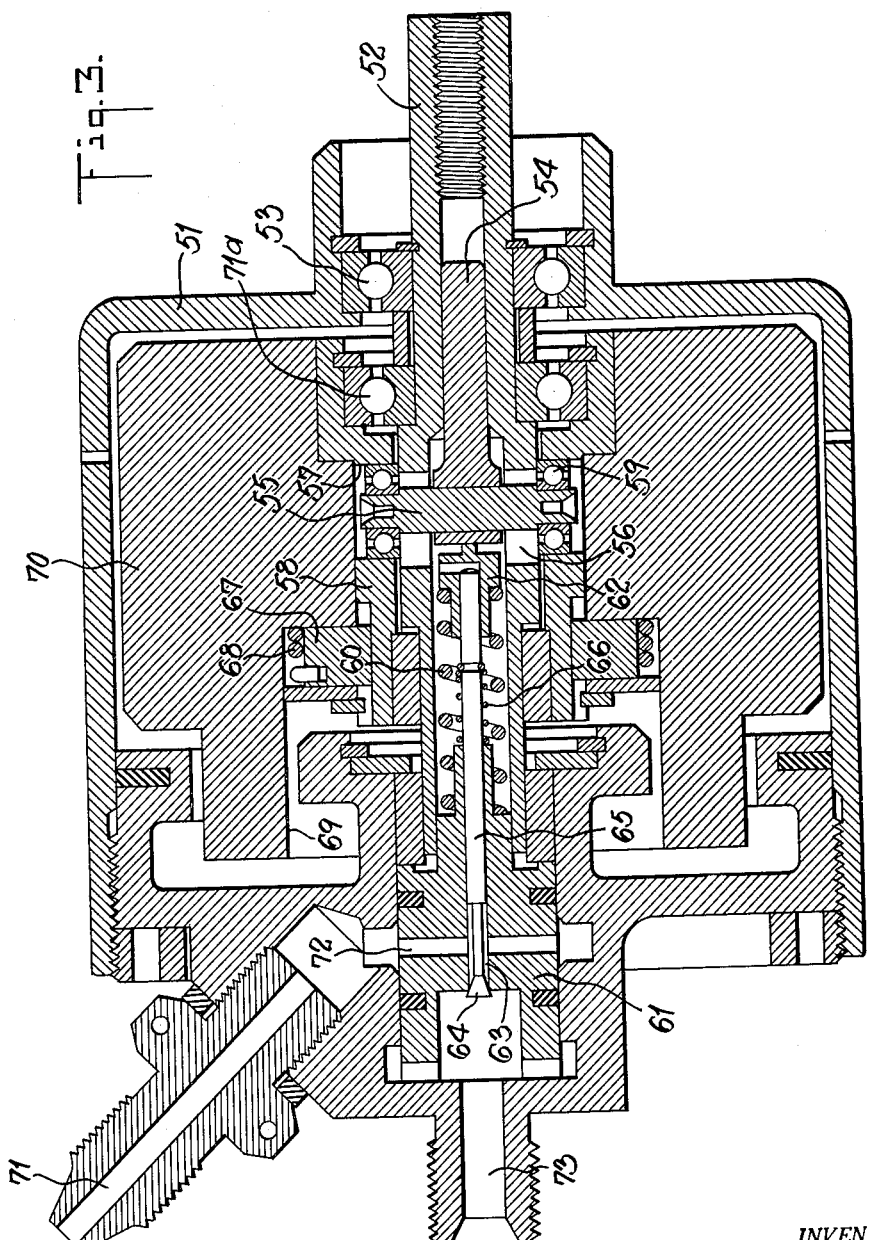
FIGURE 3 is a longitudinal section of an inertia control device such as shown in co-pending application Ser. No. 675,771 filed August 1, 1957.
Figure 4:
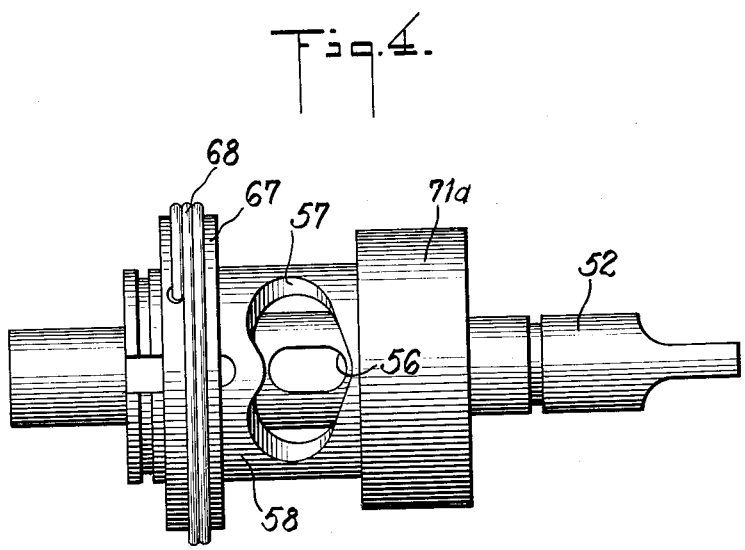
FIGURE 4 is a side elevation of an element of said inertia control device.
Figure 5:
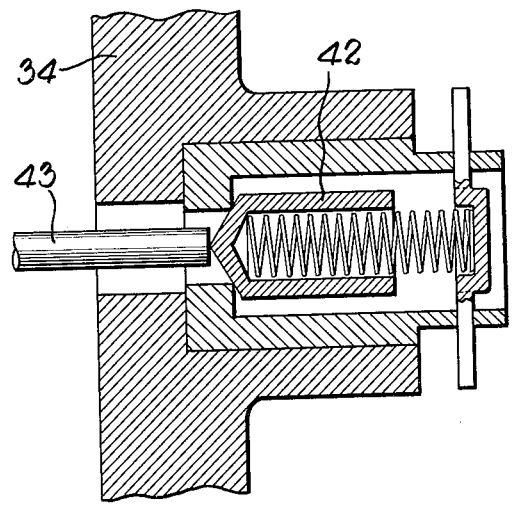
FIGURE 5 is a longitudinal section on an enlarged scale of the valve 42 and associated operating stem 43.

The inertia control device shown in FIGS. 3 and 4 comprises a housing 51 and a hollow shaft 52 to be driven from one of the elements to be braked as, for example, from a vehicle or aircraft wheel, and supported in the housing 51 by bearings 53 in the end wall of the housing.

Slidably mounted on the hollow shaft 52 is a slide element 54 having a transversely mounted cross-pin 55 extending through longitudinally extending slots 56 in the shaft 52 and thence into diametrically positioned cam slots 57, FIG. 4, in a collar 58 encircling and rotatable relatively to the shaft 52. The ends of the cross-pin 55 are provided with bearings 59 which closely engage the edges of the cam slots 57. The cam slots 57 as shown in FIG. 4 are of a general V-shaped with the apex pointing toward the outer end of the shaft 52.

Within the inner end of the shaft 52 a spring 60 is mounted with one end bearing against a fixed valve seat element 61 and the opposite end bearing against a retainer 62 which is turn bears against the inner end of the slide 54, the spring 60 thus serving to bias slide 54 toward the outer end of the shaft 52 and to bring the bearings 59 into the apices of the cam slots 57.

Within the inner hollow portion of the shaft 52 and extending through a valve passage 63 in the opposite end of the housing 51 is a valve 64 having a stem 65 extending to and engaged by the spring retainer 62 and normally retained in closed position by a spring 66 confined between the inner end of the valve seat element 61 and in engagement with the valve stem 65.

Fixed on the collar 58 is a ring 67 to rotate with the collar. A coil spring 68 is secured at one end to the ring 67 and expands to engage an inner cylindrical edge 69 of a flywheel or rotary inertia element 70 rotatable about and supported on the shaft 52 by a bearing 71a.

Through the cross-pin 55 and its bearings 59 the cam slots 57 serve to drive the collar 58 in the same direction as the rotation of the shaft 52. When the shaft 52 is rotating in a forward direction the ring 67 rotates in such a direction relative to the coil spring 68 as to tend to expand the coil spring outwardly to grip the inner surface 69 of the flywheel or rotary inertia element 70.

If the speed of the shaft 52 is reduced through the braking action on the wheel or other driving element so that its speed is less than that of the rotary inertia element 70, the latter may move forwardly with a light frictional drag on the spring 68 and on the ring 67 and collar 58. In the event of a torque delivered by the shaft 52 on the cross-pin 55 as, for example, in starting the vehicle, sufficient to compress the spring 60 by the reaction of the cross-pin and its bearings in the cam shaft 57, the cross-pin and its bearings will move from the apex of the cam slot to the ends thereof and in doing so will move the slide 54 to the left to engage and move the valve stem 65 to open the valve.

Similarly, if the speed of the shaft 52 is reduced rapidly by an excessive braking of the wheel the rotary inertia element will have a forward speed relatively greater than that of the shaft 52 and its inertia will cause the drag of the spring 68 to carry with it the ring 67 and the collar 58 forwardly relative to the shaft 52. This will cause rotation between the cross-pin 55 and its bearings 59 relative to the shaft 52 so that the cross-pin 55 and its bearings will move opposite the apex of the cam slots 57, causing the slide 54 to move to the left thereby moving the valve stem 65 and the valve 64 to open position to relieve the braking pressure and bring the cross-pin 55 back to apex of the cam slots 57. The cross-pin 55 is held from turning by the longitudinal slots 56.

When the valve 64 is open fluid is released from the brakes 14 through an inlet 71 and a channel 72 and past the open valve 64 to an outlet 73 leading to the return pipe 23.

The control valve mechanism thus operates normally as a power valve providing a hydraulic braking pressure proportional to the load on the brake pedal but can nevertheless provide emergency braking by positive displacement in case of failure of the hydraulic supply.

Having now described our invention—what we claim is:

1. A hydraulic control mechanism comprising a housing having an inlet for pressure fluid, an exhaust outlet and a supply outlet for supplying fluid under pressure to a mechanism to be operated, a valve mechanism in said housing, and an externally actuable operating member connected to said valve mechanism, said valve mechanism comprising a hollow piston slidable in said housing to close said inlet from said supply outlet and said supply outlet from said exhaust outlet, said piston having a passage from its interior to said supply outlet and a second passage from its interior to said exhaust outlet and having a valve spring pressed to close passage from said inlet to the interior of said hollow piston, an inner tubular piston and an end piston closed at its end toward said operating member co-axially aligned and slidable axially in said hollow piston, said inner piston being fluidtightly slidable in said hollow piston between said supply outlet and said exhaust outlet and said end piston being spaced radially from said hollow piston and axially from said inner piston to provide a passage to said exhaust outlet, said end piston being slidable by said operating member first to abut said inner piston to close said passage to said exhaust outlet, then to contact and open said spring pressed valve to admit pressure fluid to said supply outlet and upon further movement to move said hollow piston to pressurize fluid confined in said housing and supplied to said supply outlet.

2. The hydraulic control mechanism of claim 1 in which said housing has a second inlet and in which said valve mechanism connects said second inlet to said exhaust outlet until said hollow piston is moved to pressurize fluid in said housing.

3. The hydraulic control mechanism of claim 1 in which said hollow piston partitions said housing into a pressure chamber at said inlet and a supply chamber communicating with the supply outlet and in which said housing has a check valve opening from said inlet to said pressure chamber.

4. The hydraulic control mechanism of claim 3 in which said hollow piston is biased toward said operating element by a spring in said pressure chamber.

5. The hydraulic control mechanism of claim 1 having a check valve opening from said inlet into said housing.

6. The hydraulic control mechanism of claim 5 in which said hollow piston partitions said housing into a pressure chamber and a supply chamber and in which said housing has a second inlet and in which said outer piston has a passage positioned to connect said second inlet to said exhaust outlet and to close said second inlet from said exhaust upon further movement of said valve mechanism to pressurize fluid in said housing.

7. The hydraulic control mechanism of claim 5 in which said inner piston has an adjustable stem extending to contact said spring press valve of said hollow piston.

8. The hydraulic control mechanism of claim 6 having a spring in said supply chamber between said hollow piston and said inner piston to bias said inner piston from contact with said spring pressed valve.

9. The hydraulic control mechanism of claim 8 in which said hollow piston has a stop engaging said inner piston to limit its movement away from the end of said hollow piston and in which said end piston is spaced radially inwardly of said hollow piston to provide a passage from said supply chamber to said exhaust outlet.

10. The hydraulic control mechanism of claim 9 in which said end piston has an extension through the wall of said housing to engage said externally actuable operating member.

11. The hydraulic control mechanism of claim 1 in which said housing has a cylindrical inner surface and is closed at each end and in which said inlet enters one end and said end piston extends through the opposite end to the externally actuable operating element and in which said supply outlet is positioned between the inlet end of said housing and said exhaust outlet.

12. The hydraulic control mechanism of claim 11 in which said hollow piston slides fluidtightly on said cylindrical surface and in which said inner tubular piston slides fluidtightly on the inner surface of said hollow piston.

13. A hydraulic control mechanism comprising a housing having a pressure fluid inlet, a supply outlet, an exhaust outlet and a return outlet, a piston between said pressure fluid inlet and said exhaust and supply outlets and said return inlet to separate said housing into a pressure chamber to which said inlet delivers and a supply chamber from which said supply and exhaust outlets deliver and to which said return outlet delivers, a non-return check valve in said pressure fluid inlet, said piston having a passage from said pressure chamber to said supply chamber, a valve spring pressed to close said passage, means manually movable in said supply chamber axially of the piston successively to close said exhaust outlet from said supply outlet, to open said spring pressed valve, and to close said return inlet and move said piston inwardly in said pressure chamber to pressurize fluid therein and supply said pressurized fluid to said supply outlet.

References Cited in the file of this patent

UNITED STATES PATENTS

| | | |
|---|---|---|
| 1,662,096 | Zelov | Mar. 13, 1928 |
| 2,004,078 | McDougall | June 4, 1935 |
| 2,821,267 | Olving | Jan. 28, 1958 |
| 2,847,829 | Gladden | Aug. 19, 1958 |